United States Patent [19]

Takiguchi et al.

[11] Patent Number: 5,147,682
[45] Date of Patent: Sep. 15, 1992

[54] METHOD FOR ORIENTING A LIQUID CRYSTAL POLYMER

[75] Inventors: Yasuyuki Takiguchi; Shigeki Iida, both of Kawasaki; Takehiro Toyooka, Yokohama, all of Japan

[73] Assignees: Ricoh Company, Ltd.; Nippon Oil Company, Limited, both of Tokyo, Japan

[21] Appl. No.: 532,682

[22] Filed: Jun. 4, 1990

[30] Foreign Application Priority Data

Jun. 6, 1989 [JP] Japan .................. 1-143595

[51] Int. Cl.$^5$ ............................ B05D 5/12
[52] U.S. Cl. .................... 427/58; 427/322; 427/379; 427/393.5; 428/1
[58] Field of Search ............. 427/393.5, 58, 322, 427/379; 428/1

[56] References Cited

U.S. PATENT DOCUMENTS

| | | | |
|---|---|---|---|
| 4,469,408 | 9/1984 | Kruger et al. | 252/299.01 X |
| 4,921,728 | 5/1990 | Takiguchi et al. | 427/430.1 X |
| 5,002,361 | 3/1991 | DeMartino et al. | 252/582 X |

*Primary Examiner*—Michael Lusignan
*Attorney, Agent, or Firm*—Oblon, Spivak, McClelland, Maier & Neustadt

[57] ABSTRACT

Disclosed herein is a method of orienting a liquid crystal polymer which comprises coating and drying a solution of a polymeric compound showing a thermotropic liquid crystal property on the surface of a plastic substrate applied with a rubbing treatment, and subjecting to a heat-treatment at a temperature that the liquid crystal polymer exhibits a liquid crystal phase.

13 Claims, No Drawings

METHOD FOR ORIENTING A LIQUID CRYSTAL POLYMER

BACKGROUND OF THE INVENTION

The present invention relates to a method of orienting a liquid crystal polymer and, more in particular, it relates to a method of manufacturing a liquid crystal polymer having a light controlling function, which can be used suitably, for example, in the field of opto-electronics.

When liquid crystal material is utilized as a device, it is generally necessary to arrange liquid crystals in a predetermined arrangement (orientation) and such molecular orientation varies depending on external effects such as electric field, magnetic field, shearing force or interface. Application use of the liquid crystal materials to various kinds of optoelectronics has been developed by utilizing the light-controlling function derived from such change of orientation.

Liquid crystals are generally classified into those of high molecular and low molecular materials. High molecular (polymeric) liquid crystals have a feature in which by fixing the oriented state of liquid crystals, the polymeric liquid crystals in the state of fixing their functions are used and they are applied in a field different from that of low molecular liquid crystals. For example, there can be mentioned application uses to orientation film for low molecular liquid crystals (as disclosed in Japanese Patent Application Laid-Open (KOKAI) 61-42618), non-linear optical device (as disclosed in Japanese Patent Application Laid-Open (KOKAI) 62-201419), circular polarizing filter and notch filter (as disclosed in Japanese Patent Application Laid-Open (KOKAI) 60-191203), optical memory (as disclosed in Japanese Patent Application Laid-Open (KOKAI) 62-66990) and color compensation plate for liquid crystal display. For practical use, it is necessary that a molecular orientation is controlled at a high level. For example, a color compensation plate for a liquid crystal display, more specifically, a color compensation plate for a super twisted nematic (STN) liquid crystal display is disposed between, a liquid crystal cell and a polarization plate of a STN-type liquid crystal display for eliminating coloration due to the birefringence effect inherent to the STN liquid crystal display. The color compensation plate for the liquid crystal display serves to re-arrange elliptically polarized light having elliptic coefficient and azimuth angle which are made different depending on wavelength after passing through the cell into linearly polarized light of uniform azimuth angle again. Such a function can be developed only when the liquid crystal high molecular materials are oriented horizontally at a high degree of regularity and high homogenity in a certain direction.

By the way, a method of controlling the oriented state of low molecular liquid crystals by using an orientation film has already been established, which constitutes a fundamental technique for twisted nematic or STN liquid crystal display. On the other hand, as a method of controlling the oriented state of high molecular (polymeric) liquid crystals, a technique of orienting with higher order parameters than those of the low molecular liquid crystals, for example, a method of applying external force such as shearing stress, or a method of applying external force such as electric field or magnetic field has been known in a certain restricted region for any of nematic, smectic or cholestic liquid crystals. However, there is a drawback in such a method, that the control for orientation over a large area is impossible or the uniaxial orientation within a plane can not be controlled even if horizontal orientation can be conducted. That is, it can not be said that a technique capable of highly controlling the orientation of high molecular (polymeric) liquid crystals and fixing the oriented state has been established.

It has been demanded for providing a method of manufacturing a liquid crystal polymeric thin film which is oriented to a uniform direction within a plane in parallel with the substrate without no division to domains.

As a result of the present inventors' studies for a means capable of accurately controlling the orientation of liquid crystal polymers, it has been found that a liquid crystal polymeric film highly oriented in parallel with the rubbing direction can be obtained by depositing a certain kind of liquid crystal polymer on a plastic substrate applied with a rubbing treatment and further subjecting the obtained liquid crystal polymeric film to a heat-treatment at such a temperature that the liquid crystal polymer exhibits a liquid crystal phase. Based on the finding, the present invention has been attained.

SUMMARY OF THE INVENTION

In an aspect of the present invention, there is provided a method of orienting a liquid crystal polymer, which comprises coating and drying a solution of a polymeric compound showing a thermotropic liquid crystal property on a surface of a plastic substrate applied with a rubbing treatment and subjecting the thus obtained liquid crystal thin film to a heat-treatment at such a temperature that the liquid crystal polymer exhibits a liquid crystal phase.

DETAILED DESCRIPTION OF THE INVENTION

The method of orienting a liquid crystal polymer in accordance with the present invention comprises firmly laminating a film of a polymeric compound having a thermotropic liquid crystal property (coating film of a polymeric compound) on a surface of a plastic substrate applied with a rubbing treatment and subjecting the obtained film to a heat-treatment at such a temperature that the liquid crystal polymer exhibits a liquid crystal phase.

As typical examples of the plastic film applied with the rubbing treatment used herein, which is used as the plastic substrate, there can be exemplified polyethylene terephthalate, polyallylate, polyethylene naphthalate, poybutylene terephthalate, polyether ether ketone, polyethylene, polycarbonate, polystyrene, polyvinylidene chloride, polyimide, poyamideimide and polyetherimide. There is no particular restriction for the thickness of the plastic film but it is not less than 5 μm and, preferably from 20 μm to 1 mm in view of the productivity. It is necessary that such a plastic film has a sufficient physical strength at a temperature of orienting the liquid crystal polymer. As such a plastic film, a film laminated with other film, and a stretched plastic film may be used.

The plastic film is applied with a rubbing treatment in a specific directionalily on the side in contact with liquid crystals. As the rubbing treatment for the plastic film, the surface of the plastic film may be rubbed in one direction by directly using a cloth or cloth planted of cotton, polyester, nylon fibers, etc., or sponge of polyurethane, nylon, etc. Rubbing load is from 1 to 200 g/cm², preferably 20 to 150 g/cm².

Any liquid crystal polymer exhibiting a thermotropic property may be used. A liquid crystal polymeric film is coated and formed on a plastic substrate applied with a rubbing treatment by a method of direct coating at a temperature higher than the glass transition point at which the liquid crystal polymer has fluidity, or a method of dissolving the liquid crystal polymer into a solvent and coating the solution. In view of the uniform film thickness, a solution coating method is particularly advantageous.

Although different depending on the kind and the polymerization degree of the liquid crystal polymer used herein, as the solvent for the liquid crystal polymer halogenated hydrocarbons such as chloroform, dichloroethane, trichloroethane, trichloroethylene, tetrachloroethylene and o-dichlorobenzene; a mixed solvent of the halogenated hydrocarbons and phenolic solvents such as phenol, o-chlorophenol or cresol; aprotonic polar solvents such as dimethylformamide, dimethylacetoamide, dimethylsulfoxide or N-methylpyrrolidone; and ether solvents such as tetrahydrofuran or dioxane may be used. It is necessary to select such a solvent as capable of dissolving a liquid crystal polymer but not dissolving a plastic film. The concentration for the solution varies depending on the coating method, the viscosity of the polymer, etc. It is usually within a range from 5 to 50% by weight, preferably from 10 to 30% by weight. As the coating method, there may be used, for example, spin coating method, roll coating method, gravure coating method or dipping method.

Upon practicing the method according to the present invention, it is preferable to adopt a method of orienting a liquid crystal polymeric film by contacting only one surface thereof with a (stretched) polymeric film. A method of applying a rubbing treatment on both surfaces and contacting a liquid crystal polymeric film with the both surfaces of the plastic substrate, or a method of contacting other substrate applied with orientation treatment with the plastic substrate described above may also be considered, but sufficient molecular arrangement (orientation) can not be obtained easily in this case because of high viscosity inherent to the polymeric liquid crystals.

The temperature for the heat-treatment upon arranging (orienting) the liquid crystal polymer is such a temperature that the liquid crystal polymer exhibits a liquid crystal phase, that is, a temperature higher than the glass transition point of the liquid crystal poymer. In view of assisting the orientation by the interface effect of the plastic substrate applied with the rubbing treatment, lower viscosity of the polymer is better and accordingly, higher temperature is preferred. However, too high temperature is not preferred since it increases the cost and results in the worsening of the operationability. Further, some kinds of liquid crystal polymers have an isotropic phase at a high temperature range than in a nematic phase but it often fails to obtain uniform orientation even if the heat-treatment is applied in such a high temperature range. As described above the temperature for the heat-treatment is higher than the glass transition point of the liquid crystal polymer and is lower than the transition point to the isotropic phase, and the temperature for the heat-treatment is determined by the mesomorphic temperature range of the polymeric liquid crystals and the heat stability of the substrate. Generally the preferable temperature for the heat-treatment is within a range from 50° to 300° C., more preferably, from 100° to 250° C. In view of the relationship with the phase of the liquid crystal polymer, it is preferred that the liquid crystal polymer has a nematic phase or cholesteric phase at the heat-treating temperature and no uniform orientation can be attained easily with the smectic phase because of high viscosity. The time for the heat-treatment required for obtaining a sufficient orientation in a liquid crystal state on a plastic substrate applied with a rubbing treatment varies depending on the compositions and the molecular weight of the polymer and they can not be defined generally. However, a time ranging from 10 sec to 2 hours, more preferably from 30 sec to 1 hours is preferred. If it is shorter than 10 sec, orientation becomes insufficient.

The liquid crystal polymeric film according to the present invention exhibits a thermotropic nature. As typical examples, there can be mentioned, specifically, main chain-type liquid crystal polymers having liquid crystalline residual group in the main chain, such as polyester, polyester amide, polycarbonate and polyether:

$$+M^1-X^1+A^1-X^2+$$

wherein
X¹ and X² represent respectively —COO—, —CONH—, —OCO—, —O— etc.,
M¹ represents —Ph—COO—Ph—,

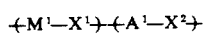

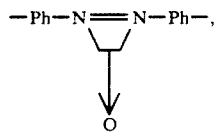

—Ph—Ph—, —Ph—Ph—COO—Ph—, —Ph—N=CH—Ph— etc.,
A¹ represents $+CH_2+_n$, $+CH_2CH_2O+_n$,

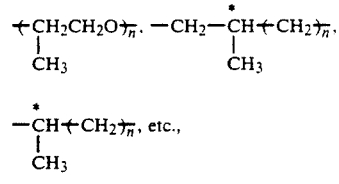

(wherein Ph represents a phenylene group,

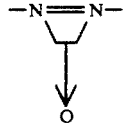

represents

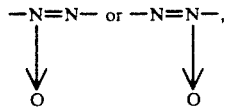

* represents an asymmetric carbon atom, and n represents an integer of 0 to 18), vinylic and siloxane polymers represented by the following structural formula (5):

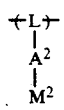

wherein L represents

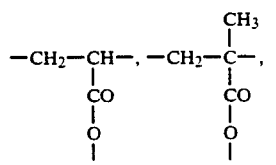

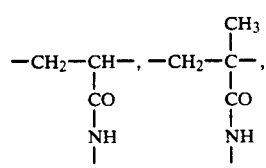

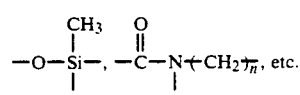

$A^2$ represents $+CH_2+_n$, $+CH_2CH_2O+_n$,

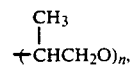

etc., $M^2$ represents —Ph—PH—$R^3$, —O—Ph—Ph—$R^3$, —Ph—COO—Ph—$R^3$, —O—Ph—COO—Ph—$R^3$, —Ph—COO—Ph—$R^3$, —O—Ph—OCO—Ph—$R^3$, —Ph—Ph—COO—Ph—$R^3$, —O—Ph—Ph—COO—Ph—$R^3$, —Ph—COO—Ph—Ph—$R^3$, —O—Ph—COO—Ph—Ph—$R^3$, —Ph—Ph-OCO—Ph—$R^3$, —O—Ph-OCO—Ph—Ph—$R^3$, —Ph-OCO—Ph—Ph—$R^3$, —O—Ph-OCO—Ph—Ph—$R^3$ etc , (wherein $R^3$ represents hydrogen atom, ($C_1$-$C_{18}$) alkyl group, ($C_1$-$C_{18}$) alkoxy group, halogen atom, nitro group or cyano group and n represents an integer of 0 to 18), etc.

In the liquid crystal polymeric film oriented in the liquid crystal state, the state of orientation can be fixed by cooling it to a temperature lower than the glass transition point.

There is no particular restriction on the cooling rate and it is sufficient by merely transferring from a heated atmosphere to an atmosphere lower than the glass transition point.

The film thickness of the liquid crystal polymer is preferably within a range of not greater than 100 μm, more preferably 0.02 to 50 μm. If it exceeds 100 μm, it is difficult to obtain uniform orientation.

The substrate with a liquid crystal polymeric thin film is used near a room temperature, and when fixing the orientated state of the liquid crystals by cooling to lower than the glass transition point, the glass transition point of the liquid crystal polymer is preferably not lower than 30° C., more preferably not lower than 50° C. If the glass transition point is lower than 30° C., the fixed liquid crystal structure may some time be changed when used near the room temperature.

In the method according to the present invention, the liquid crystal polymer may be introduced with optically active groups, or incorporated with liquid crystal high molecular compound, liquid crystal low molecular compound, non-liquid crystal material, etc. having optically active groups so that it exhibits a cholesteric phase.

As the application uses, there can be mentioned elliptically polarized filter, notch filter, optical memory or light memory utilizing selective reflection of the cholesteric phase, color compensation plate for STN-type liquid crystal display, etc. In this case, molecules of the liquid crystal polymer in contact with the substrate (plastic film applied with the rubbing treatment) are oriented in parallel with the rubbing direction applied to the substrate and form a twisted structure corresponding to the pitch of the liquid crystal polymer in the thickness direction.

The film obtained as described above may be used as it is, or a protection layer of transparent plastic may be disposed thereon for the protection. Further, it may be used in combination with other optical device such as a polarization plate.

According to the present invention, since a film of a liquid crystal polymer which is horizontal and controlled with the directionality can be obtained by merely heating and then cooling a laminate comprising a plastic substrate applied with a rubbing treatment and a coating film of a liquid crystal polymeric solution, the manufacturing means is simple and productivity is high. Further, the thus obtained oriented liquid crystal polymeric film is uniform and transparent, and has a single-domain structure of excellent optical property. Further, it is also possible to provide a twisted structure by using a cholesteric liquid crystal polymer. By utilizing such features, it is of an extremely great industrial value in the field of compensation plate for liquid crystal display optical filter, memory medium and non-linear optical device.

EXAMPLE

The present invention is explained in more detail in the following Examples; however, it should be recognized that the scope of the present invention is not restricted to these Examples.

EXAMPLE 1

A rubbing treatment was applied for five times to one surface of a uniaxially stretched polyester film of about 100 μm in thickness (trade name: Lumilar U20, manufactured by Toray Co. Ltd.) at an angle of 45° relative to the stretching axis at a rate of 15 cm/sec under a load of 100 g/cm² by using a cotton-planted cloth.

A tetrachloroethane solution containing 20% by weight of a liquid crystal polymer (racemi modification) having a nematic phase represented by the following formula:

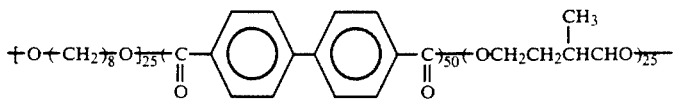

(glass transition point: 44° C., nematic phase—anisotropic phase liquid transition point : 150° C.) was coated on the rubbed surface by using a spin coating method and then dried at 70° C. to form a film of about 4 μm in thickness. The specimen was subjected to a heat-treatment at 130° C. for 30 min.

The specimen was transparent and uniform over the entire surface (10 cm × 10 cm), and free from orientation defects such as discrimination. Further, when a minute specimen (2 cm × 2 cm) manufactured in the same procedures as described above was observed by polarization microscope under a Cross Nicol arrangement while being kept at 130° C. by using a Hot Stage FP 82 (manufactured by Mettler Co.), a blue interference color corresponding to about 6 μm which was the retardation of the liquid crystal polymer was observed at the position where the rubbing direction of the substrate aligned with the transmission axis or the absorption axis of the polarization plate and it was confirmed that the liquid crystal molecules were oriented in parallel with the rubbing direction.

Further, when thus obtained specimen was cooled to a room temperature, it was confirmed also from the observation by the polarization microscope that an orientation substantially equal with that of the liquid crystal phase was fixed.

EXAMPLE 2

A liquid crystal polymeric film was formed in the same procedures s those in Example 1 except for using, as the substrate, a stretched polyether ether ketone film of about 25 m in thickness (TALPA 2000, manufactured by Mitsui Toatsu Co.). The resultant liquid crystal polymer showed excellent orientation property like that in Example 1.

EXAMPLE 3

A liquid crystal polymer oriented in the same procedures as those in Example 1 was manufactured by using a solution of tetrachloroethane containing 20% by weight of a liquid crystal polymer comprising the liquid crystal polymer shown in Example 1 incorporated with 5% by weight of an optically active liquid crystal polymer with the same structure.

The polymer was transparent and uniform with no defects in the liquid crystal state and as a result of the polarization analysis, it was confirmed that the polymer was oriented in parallel with the rubbing direction of the substrate and had a cholesteric planar structure twisted by about 150° in the direction of the thickness on the substrate. Further, it was confirmed that the structure was kept substantially at it was when the thus resultant liquid crystal polymer was cooled to a room temperature.

EXAMPLE 4

A liquid crystal polymer having an nematic phase represented by the following formula:

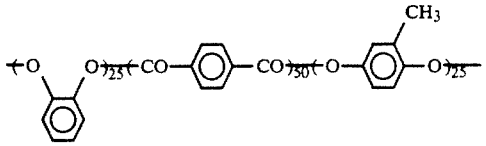

(glass transition point: 105° C.)

was used as the liquid crystal polymer, which was dissolved into 1,1,2,2-tetrachloroethane to prepare a 15 wt% solution.

The solution was coated by means of a spin coating method on a polyether ether ketone film applied with the same rubbing treatment as in Example 2 as a substrate and then dried at 70° C..

Subsequently, the specimen was subjected to a heat-treatment in a thermostable air bath 190° C. for 5 min. The specimen was transparent and uniform and orientation defects such as discrimination were not observed at all.

When the specimen was cooled to a room temperature, the film had a thickness of about 1.1 μm and was completely transparent and smooth. When the film was observed by a polarization microscope under a cross Nicol arrangement, substantially colorless bright view field corresponding to about 1.1 μm of the film thickness was observed at a position in which the rubbing direction of the substrate aligned with the transmission axis of the polarization plate and no defects were observed at all.

What is claimed is:

1. A method of orienting a liquid crystal polymer, which comprises:
   a) rubbing a plastic substrate in one direction by directly using a rubbing member,
   b) coating and drying a solution of a polymeric compound having a thermotropic liquid crystal property on the surface of the plastic substrate, and
   c) a subjecting the coated plastic substrate to a heat-treatment at a temperature whereby the liquid crystal polymer exhibits a liquid crystal phase.

2. A method according to claim 1, which further comprises cooling to a temperature lower than the glass transition point after the heat-treatment.

3. A method according to claim 1, wherein the heat-treatment is carried out at a temperature higher than the glass transition point of the liquid crystal polymer.

4. A method according to claim 3, wherein the heat-treatment is carried out at 50° to 300° C. for 10 sec to 2 hours.

5. A method according to claim 1, wherein the thermotropic liquid crystal polymeric compound has a glass transition point of not lower than 30° C.

6. The method according to claim 1, wherein said plastic substrate comprises polyethylene terephthalate, polyallylate, polyethylene naphthalate, polybutylene terephthalate, polyether ether ketone, polyethylene, polycarbonate, polystyrene, polyvinylidene chloride, polyimide, polyamideimide or polyetherimide.

7. The method of claim 1, wherein said plastic substrate has a thickness of from 5 μm to 1 mm.

8. The method of claim 1, wherein said rubbing member comprises a cloth; a cloth containing cotton, polyester or nylon fibers; or a sponge of polyurethane or nylon.

9. The method of claim 1, wherein said webbing is effected with a load of from 1 to 200 g/cm².

10. The method of claim 1, wherein said polymeric compound comprises polyester, polyester amide, polycarbonate, polyether, vinylic or siloxane polymer.

11. The method of claim 1, wherein said polymeric compound is coated in a solution containing a solvent which dissolves said polymeric compound, but which does not dissolve the plastic film.

12. The method of claim 1, wherein the solution of the polymeric compound has a concentration of polymeric compound from 5 to 50% by weight.

13. The method of claim 4, wherein the heat-treatment is carried out at 50° to 300° C. for 10 sec. to 2 hours.

* * * * *